J. C. GREENWAY.
APPARATUS FOR EXTRACTING METALS FROM THEIR ORES.
APPLICATION FILED MAR. 31, 1915.
1,200,832.
Patented Oct. 10, 1916.
2 SHEETS—SHEET 1.
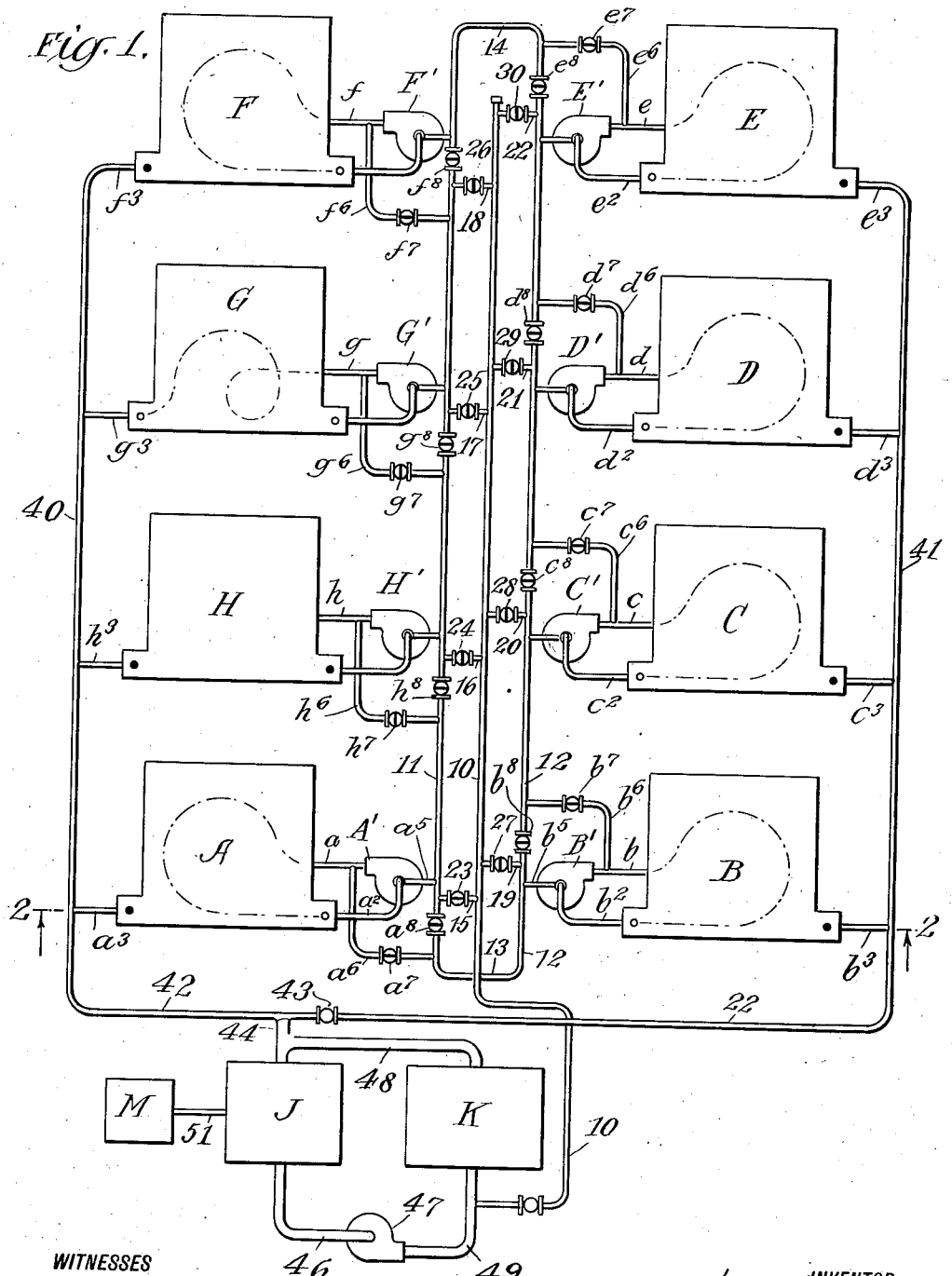

J. C. GREENWAY.
APPARATUS FOR EXTRACTING METALS FROM THEIR ORES.
APPLICATION FILED MAR. 31, 1915.
1,200,832.
Patented Oct. 10, 1916.
2 SHEETS—SHEET 2.
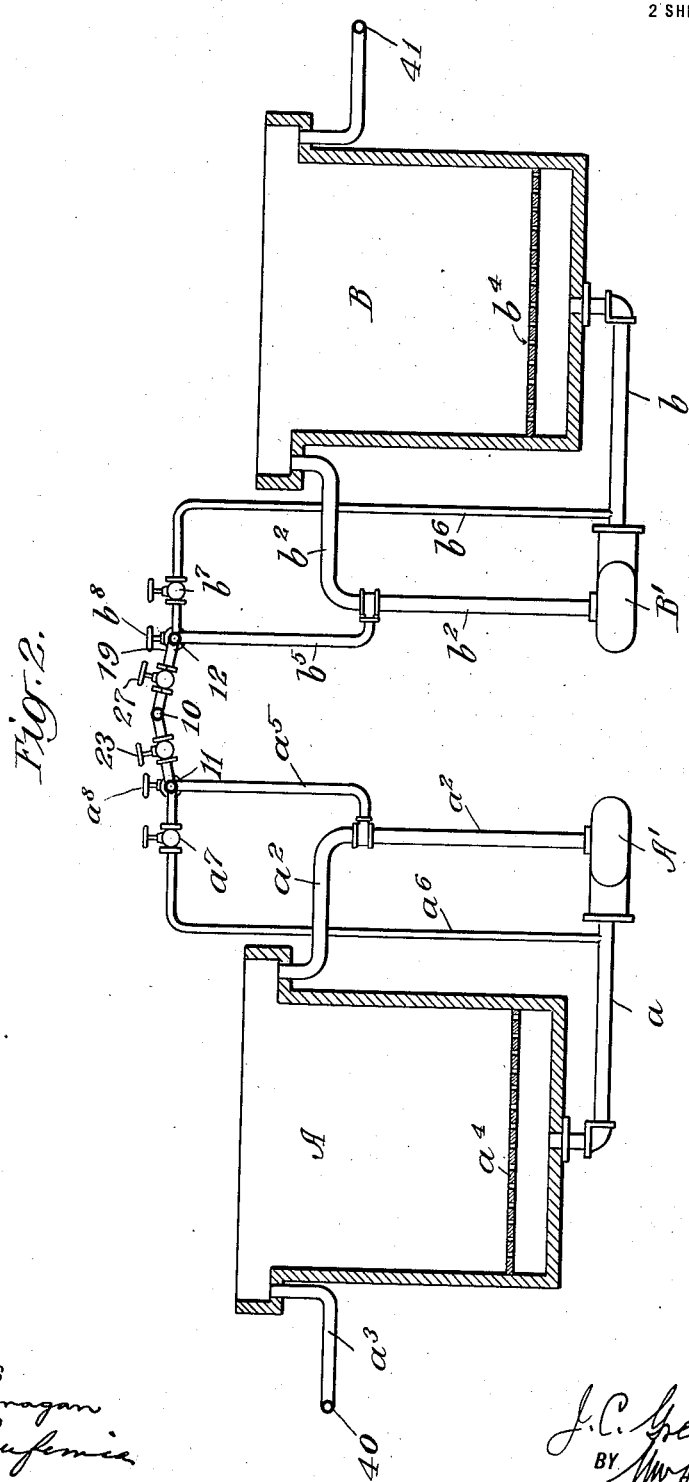
WITNESSES
INVENTOR
J. C. Greenway
BY
ATTORNEY

UNITED STATES PATENT OFFICE.

JOHN C. GREENWAY, OF WARREN, ARIZONA.

APPARATUS FOR EXTRACTING METALS FROM THEIR ORES.

1,200,832.

Specification of Letters Patent.

Patented Oct. 10, 1916.

Application filed March 31, 1915. Serial No. 18,289.

*To all whom it may concern:*

Be it known that I, JOHN C. GREENWAY, a citizen of the United States, and a resident of Warren, county of Cochise, State of Arizona, have invented certain new and useful Improvements in Apparatus for Extracting Metals from Their Ores, of which the following is a specification.

My invention relates to improvements in apparatus for extracting metals, preferably copper, from their ores by leaching in such a manner as to obtain a good extraction and at the same time maintain the solution low in impurities in order that the copper can be economically separated without further preparation or purification.

Before describing my invention, the advantages and objects thereof, I will review some of the previous processes for leaching and recovering the metals carried by the lixiviant, and the disadvantages thereof. The processes referred to can be broadly divided into three groups or classes.

First: Those processes using the electric current as a means of separating the metals from the solution, as for example, the electrolytic deposition of copper. The principal disadvantage of this class of processes has been the interference of other metals. Of these, iron in excess is the most troublesome, as its alternate oxidation and reduction at the anode and cathode causes the solution of copper, thus reducing the electrical efficiency, this reduction in some cases being so great as to make electrolytic deposition prohibitive. In addition, it is generally necessary to use the lixiviant over and over, thus fouling the solution by the accumulation of impurities which further reduces the efficiency of the process. The detrimental effects of these impurities may be partly overcome by (*a*) the use of permeable diaphragms around the anodes; (*b*) by the removal of the impurities from the electrolyte previous to its entrance into the electrolytic cell; (*c*) by converting the iron from the ferric to the ferrous state by supplemental treatment in a plant extraneous to the leaching system. To accomplish this reduction it is generally necessary to use various reagents with or without the aid of heat or pressure or both. All of these methods are expensive and unsatisfactory and have not yet been found practicable on a commercial scale.

Second: Those processes in which the metals are removed by simple replacement or substitution with another metal, as for example, the precipitation of copper from a solution by means of metallic iron. Among the disadvantages of this class may be mentioned the high consumption of precipitant, due to the free acid invariably present in lixiviants unless previously neutralized. Neither the free or combined acid nor the precipitant in these processes can be economically regenerated.

Third: Those processes in which the metals are precipitated by the addition of one or more reagents with or without the aid of heat and pressure, or both. Of this class, I may mention the precipitation of copper as copper sulfid by the use of hydrogen sulfid or the precipitation of metallic copper in a sulfate solution by means of sulfur dioxid, with the aid of heat and pressure. Among the disadvantages of using processes of this class is their complexity, and number of manipulations which increases the cost of operation.

I have discovered that when copper bearing solutions containing ferric sulfate are rendered neutral by repeated circulation of the solution on the ore, and when thus neutral, are subjected to an excess of natural oxidized copper compounds, the detrimental ferric sulfate will be precipitated from the solution in an insoluble or partly insoluble oxid. This is then removed from the system with the mechanical moving of the tails.

The chemical equation involved in this process is important, the reaction probably being as follows:

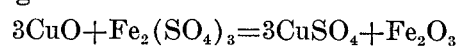

$$3CuO + Fe_2(SO_4)_3 = 3CuSO_4 + Fe_2O_3$$

The chief object of my invention is to provide a means for leaching a series of bodies of ore, such that the leaching solution will be discharged from the last body substantially neutral, thereby requiring a minimum amount of acid and giving a very efficient extraction of the metal, and at the same time to remove impurities from the solution, thereby facilitating the separation of the metal from the solution.

One form of apparatus which I have found very suitable for carrying out my process is illustrated in the accompanying drawings in which the same reference character indicates the same part in the several views.

Referring to the drawings: Figure 1 is a diagrammatic plan view of the apparatus. Fig. 2 is a cross sectional view on line 2 of Fig. 1.

On the drawing the part marked K represents an electrolytic tank or system of tanks of the usual well known construction where copper is recovered from the solution of electrolyte in the tank in the form of a cathode. 10 is a pipe connected to the said tank leading toward the system of ore or leaching tanks to be hereinafter referred to. 11 and 12 are other pipes extending adjacent to the pipe 10, the latter two pipes being connected together by the pipes 13 and 14. The pipes 10 and 11 are connected together by the pipes 15, 16, 17 and 18, respectively, and the pipe 10 is connected to the pipe 12 by connecting pipes 19, 20, 21 and 22. Each of these connecting pipes is provided with a valve 23, 24, 25, 26 and 27, 28 and 29 and 30, respectively.

A, B, C, D, E, F, G and H are leaching tanks, in the bottom of each of which is a perforated false bottom, $a^4$, $b^4$, and so forth. The construction and connection of these tanks to the pipes 10, 11 and 12 are the same and the description of one will answer for all.

A′ is a pump. Extending from said pump to the bottom of the tank A is a supply pipe $a$. Extending from the top of the tank A and leading to the pump A′, is the overflow pipe $a^2$, and $a^3$ is another overflow pipe at the opposite side of the tank. Connected to the pipe 11 and communicating with the overflow pipe $a^2$ is a supply pipe $a^5$.

$a^6$ is a branch pipe leading from the pipe $a$ and connected to the pipe 11. In said pipe $a^6$ is a regulating valve $a^7$. In the pipe 11 between the branch pipe $a^6$ and supply pipe $a^5$ is a cut-off valve $a^8$.

40 is a line pipe adjacent to the tanks A, H, G and F for instance, and 41 is another pipe adjacent to the tanks B, C, D and E. The overflow pipes $a^3$, $h^3$, $g^3$ and $f^3$ are connected to the pipe 40, and the overflow pipes $b^3$, $c^3$, $d^3$ and $e^3$ are connected to the line pipe 41. The line pipes are connected together by the pipe 42 having a cut-off valve 43 therein. Extending from the pipe 42 is another pipe 44, which communicates with the sump J.

46 is a pipe extending from the sump J to the electrolytic tank K, and 47 is a pump in said pipe 46. Extending from the electrolytic tank K and connected with the pipe 44 is another pipe 48. M is a sulfuric acid tank and 51 is a pipe extending to said tank and communicating with sump J.

The operation of the apparatus is as follows: We will consider that the leaching tanks A to H have been successfully filled with ore, the tank A being filled seven or more days in advance of tank G, the tank B, six days in advance of G, the tank C, five days in advance of G, and so forth. The tank H having been filled eight days in advance of G and having been running that number of days, it has been cut out of the system for cleaning, washing and refilling. All of the tanks and pipes have been filled with a solution containing a certain amount of sulfuric acid and as this acid circulates through the system of pipes and leaching tanks, the amount of acid contained in the solution runs from 3 to 4 per cent. as it circulates through tank A to a substantially neutral solution as it circulates through G. We will suppose that the amount of solution circulating through each tank, A for example, is 100 gallons per minute. This solution is forced up by the pump A′ through the pipe $a$, up through the tank and it overflows through the pipe $a^2$ back to the pump. Circulating through the pump 47, for example in the same time are 110 gallons of solution, 100 of which go into the electrolytic tank K, and 10 gallons of which are forced into the pipe 10. The solution passes out of pipe 10 through valve 23, through the pipe $a^5$ and into the overflow pipe $a^2$, supplying 110 gallons to the pump A′. During the same period of time 110 gallons leave the pump A′, but 10 gallons pass out of the pipe $a^6$, into the pipe 11 on the other side of the valve $a^8$, and thence through the connecting pipe 13, into the pipe 12, through the pipe $b^5$ into the overflow pipe $b^2$, making 110 gallons which are forced out of the pump B′, through the pipes $b$ and $b^6$, 100 gallons going through the first mentioned pipe into the bottom of the leaching tank B, and overflowing back into the pipe $b^2$, the 10 gallons going through pipe $b^6$ back into pipe 12, on the opposite side of the valve $b^8$. This course is taken by the solution through the system until it reaches G. At G, 10 gallons overflow through the overflow pipe $g^3$ and circulate through pipe 40 to pipe 42, to pipe 44 and into the sump J. The incoming solution of 10 gallons meets the 100 gallons coming from the electrolytic tank K, through pipe 48 and thus circulates through the sump J, 110 gallons which are forced out through pipe 46 by the pump 47 into the pipe 49, where it branches, 100 gallons going into K and 10 gallons going into pipe 10.

From this it is apparent that the ore in leaching tank A has been subjected to seven days' treatment, the ore in B to six days' treatment and so on down to G where there has been only one days' treatment of the ore. During this operation there has been extracted various quantities of copper from the ore in each tank. The solution resulting from the disposition of the copper sulfate in the tank K together with the new acid added from the tank M, which may be done from time to time through the pipe 51 into the sump J, is first brought in contact with the ore in that tank A, which has already been leached six days. This solution is continuously circulating through all the tanks as has just been described.

I prefer to maintain an upward circulation through the ore in the tanks, as I have shown and described, as I thereby introduce a tendency to make the body of ore porous, while a downward circulation tends to pack the ore. It is to be understood, however, that in some cases, I can successfully circulate the solution downward. Furthermore, the upward circulation has a tendency to decrease the segregation which will form in leaching tanks under certain conditions. This so called segregation forms a layer of impervious material which the acid cannot penetrate and thus prevents good extraction of the metal. It is apparent, also, that I can circulate the solution continuously or intermittently through the system, and the system is such that I can circulate the solution through any one tank and from any one tank to a succeeding tank, or from any one tank past the succeeding or any number of succeeding tanks to any other system, and from the last mentioned tank back to the electrolyte through the sump. The lixiviant in going from a leaching tank of one age to a leaching tank of a lesser age, and consequently through a charge containing a greater copper content, will extract the copper and become poorer and poorer in free acid.

I have shown eight leaching tanks in my system. The number of tanks, however, may be varied, according to the kind of ore being treated and other conditions, and the number of days the ore is leached may be likewise changed. It is essential, however, that there be a sufficient number of tanks used so that the solution becomes neutral in passing through the last tank. It is also apparent that instead of introducing the acid solution from the tank M into the sump J, that it may be introduced into the system at any other point or points. The solution coming in contact with the new or latest charge of ore in tank G, for example, re-acts upon the copper oxids, precipitating ferric sulfate to a greater or less extent, depending upon the relative quantities of ferric sulfate and copper carbonate or oxids, or a mixture of both. During the operation, ferric oxid is uniformly precipitated through the system and channeling is avoided and better extraction is secured.

The cathode copper resulting from the electrolytic action in tank K is of unusual purity. The detrimental elements of electrolytic copper, such as arsenic and antimony, are removed with the tails. I may also state that in treating the copper ore by my process, the iron and alumina are removed therefrom by precipitation either in an insoluble or partly insoluble form in the leaching system itself and they are also removed and passed from the system with the mechanical removal of the tails.

While I have described the use of electricity—and this is the means which I prefer to use to recover the copper leached out of the ore—I do not confine myself to its use. The fact that the copper sulfate solution obtained by me is in a neutral state and is free or practically free from ferric sulfate enables me to precipitate the copper on iron in an economical way.

It is apparent from what I have described that some of the specific advantages of my process are: 1. That I can leach the ore containing the copper with a minimum amount of sulfuric acid. 2. I can obtain a high percentage of extraction. 3. I can produce a lixiviant direct from the leaching system which is of such purity as to permit of its economical treatment by electrolysis, using standard non-diaphragm electrodes.

I am thus enabled to produce a lixiviant direct from the leaching system which will be of such purity as to cause the minimum amount of oxidation and deterioration of anodes and am thus able to get a low anode replacement cost.

I can extract the copper values from an ore and at the same time produce a lixiviant having a high copper content and which is practically neutral. In this manner, a lixiviant is produced which is particularly suitable for economic precipitation of copper, either by electricity or some form of chemical precipitant. The lixiviant having thus been purified by the natural carbonate or oxid of copper or both, while passing through the charge, has had removed from it, elements not only detrimental to the electrolytic deposition, but also elements like arsenic, antimony and bismuth which would necessitate the refining of the resultant product. I precipitate the objectionable salts of iron and alumina in the leaching system itself in an insoluble or partly insoluble form and these are removed mechanically with the tailings.

I am enabled by neutralizing the lixiviant before mixing it with the electrolyte to render the iron that may be present in such condition that when subjected to the electrolysis by an insoluble anode a reduction and not an oxidization takes place in the electrolytic cell. If free sulfuric acid were present in the lixiviant when introduced into the electrolytic cell, an oxidization would take place and there would be a decrease in the ferrous sulfate and an increase in the ferric sulfate. By my invention I am enabled to increase the ferrous sulfate and decrease the ferric sulfate.

Having now described my invention, what

I claim as new and desire to secure by Letters Patent is:

1. An apparatus for extracting metal from its ores comprising a series of leaching tanks adapted to contain the ore, a circulating pump for each tank having its inlet and outlet connected to said tank for circulating leaching solution in each tank, means for advancing the solution from each tank to the succeeding tank, means for supplying solution to the first tank of the series, and means for withdrawing solution from the last tank of the series.

2. An apparatus for extracting metal from its ores comprising a series of leaching tanks adapted to contain the ore, a circulating pump for each tank having its inlet and outlet connected to said tank for circulating leaching solution in each tank, and means for advancing the solution from each tank to the succeeding tank, means for supplying solution to the first tank of the series, and means for withdrawing solution from the last tank of the series, said supply and withdrawal connections for the solution being interchangeably connected to all the tanks to permit cyclic shifting of the operation throughout the series of tanks.

3. The combination of a series of leaching tanks, a precipitating apparatus, a circulating pump for each tank having its inlet and outlet connected to said tank for circulating leaching solution in each tank, and means for circulating leaching solution through all the series of tanks and through the said precipitating apparatus.

4. In apparatus for extracting metals from their ores, a series of leaching tanks, a circulating pump for each tank having its inlet and outlet connected to said tank for repeatedly circulating a solution through each tank, a precipitating apparatus, outlet means from each tank leading to said precipitating apparatus, a supply pipe leading from said precipitating apparatus and having controllable communication with each tank, means connecting successive tanks of the series to advance a portion of the solution from each tank to the succeeding tank, and means for shutting off any one of the tanks from the supply connection.

5. An apparatus for leaching ores comprising a series of leaching tanks adapted to contain the ore to be treated, pumping means for each tank having inlet and outlet connections to each tank for circulating a solution upwardly through the ore in each tank, advance connections between successive tanks in the series, and means for circulating solution through said tanks and said advance connections.

6. An apparatus for separating a metal from its ores, comprising a series of leaching tanks adapted to contain the ore, a sump, a precipitator, a pump and pipe connections for circulating leaching solution through said sump and said precipitator in a precipitating cycle, and a pump and pipe connections for each tank for circulating leaching solution in each tank in a local leaching cycle, said pumps and pipe connections also being adapted to continuously circulate said leaching solution through the series of tanks, the sump, and the precipitator in a general leaching and precipitating cycle.

7. An apparatus for separating a metal from its ores, comprising a series of leaching adapted to receive the ore, a sump, a precipitator, a pump and pipe connection, for circulating leaching solution through the sump and the precipitator in a precipitating cycle, a pump and pipe connections for each tank for circulating said leaching solution through each tank in a local leaching cycle, and means for circulating said leaching solution through the series of tanks, the sump, and the precipitator in a general leaching and precipitating cycle.

In witness whereof I have hereunto set my hand at Warren, county of Cochise and State of Arizona, this 25th day of March, 1915.

JOHN C. GREENWAY.

In presence of—
    PAUL STEVENS,
    WINIFRED COUMLES.